Dec. 2, 1952 K. E. LYMAN 2,620,053
TRANSVERSELY MOVABLE PISTON TYPE CLUTCH
Filed Oct. 3, 1946
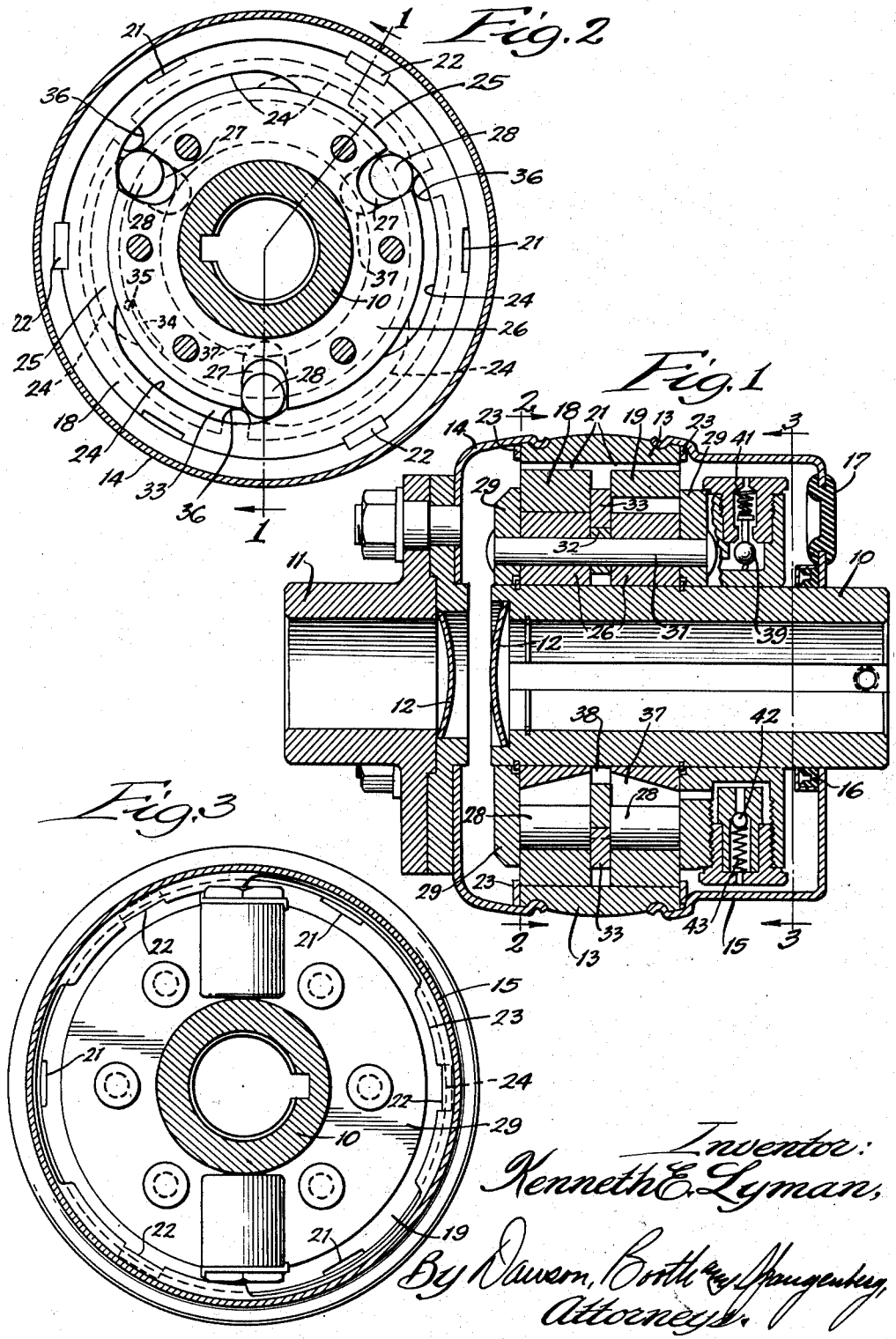
Inventor:
Kenneth E. Lyman,
By Dawson, Booth and Spangenberg,
Attorneys.

Patented Dec. 2, 1952

2,620,053

UNITED STATES PATENT OFFICE 2,620,053

TRANSVERSELY MOVABLE PISTON TYPE CLUTCH

Kenneth E. Lyman, Lake Forest, Ill., assignor to Foote Bros. Gear and Machine Corporation, Chicago, Ill., a corporation of Delaware Application October 3, 1946, Serial No. 700,866

10 Claims. (Cl. 192—60)

This invention relates to couplings and more particularly to hydraulic torque transmitting couplings.

It is one of the objects of the invention to provide a coupling which has maximum torque capacity for a given coupling size. This object may be accomplished by providing a plurality of fluid displacement members operable simultaneously to produce maximum fluid displacement with minimum size of coupling parts.

Another object is to provide a coupling which is reversible to produce similar torque transmission in either direction of rotation. According to one feature of the invention, reversibility may be accomplished by providing a fluid control valve which is shiftable in response to the direction of the rotation of the coupling.

Still another object is to provide a coupling which produces a smooth continuous transmission of torque during operation.

Still another object is to provide a coupling in which a plurality of series of recesses and gate members are arranged in staggered relation to each other to be alternately effective for torque transmission.

A further object is to provide a coupling which may easily be controlled to produce the desired operating characteristics.

A still further object is to provide a coupling which is simple and inexpensive to construct, which is entirely self-contained, and in which the bearing loads are entirely balanced.

The above and other objects and advantages of the invention will be more readily apparent from the following description when read in connection with the accompanying drawing, in which—

Figure 1 is an axial section through a coupling embodying the invention on the broken line 1—1 of Figure 2; and Figures 2 and 3 are sections on the line 2—2 and 3—3 respectively of Figure 1.

The coupling, as shown, is adapted to connect a pair of co-axial shafts such, for example, as a motor shaft and a shaft to be driven by the motor. For this purpose, a pair of tubular hubs 10 and 11 are provided, one of which may be connected to the motor shaft and the other to the driven shaft through suitable keyways or splines in the hubs. Although either hub may be driven with satisfactory results, it is preferable to drive the hub 10 which carries the rotor, as described hereinafter. The inner ends of both hubs are closed by sealing members 12 which are shown as welch plugs.

The hub 11 carries a hollow casing including a central tubular part 13 having a cup-shaped disc 14 secured to one end thereof to connect it to the hub 11. The casing is completed by a cup-shaped end part 15 sealed against the hub 10 by an annular seal 16 so that the casing is fluid tight. The casing may be filled with oil or other desired liquid through a filler opening which is closed by a removable closure 17 of the type more particularly described and claimed in my copending application, serial No. 700,867, filed October 3, 1946, now abandoned.

The casing part 13 carries a pair of casing rings 18 and 19 which may be identical and which are rigidly secured within the casing. To mount the casing rings, each of them is formed with a plurality of keyways 21 shown as six in number, and the casing part 13 is formed with a smaller number of keyways shown as three. Keys 22 are received in the three keyways in the rings 18 and 19, but the remaining keyways in the rings are left blank to form fluid passages. The rings are held against movement outward of the casing part 13 by retainer rings 23 secured to the part 13 and extending partially over the ends of the rings 18 and 19. As best seen in Figure 3, the retainer rings 23 are cut away at the points where they register with the open keyways 21 and may have tongues bent therefrom, as indicated at 24′, extending into the keyways which carry keys to hold the keys in place and to cause the retaining rings to rotate with the casing.

As best seen in Figure 2, each of the rings 18 and 19 is formed with a series of circumferentially spaced recesses 24 separated by cylindrical lands 25. In the preferred construction illustrated, the lands and the recesses are of substantially equal circumferential length and the recesses are of uniform radial depth throughout the major portion of the length and taper gradually inward to the lands adjacent the ends. The hub member 10 carries a cylindrical rotor fitting rotatably in the casing and engaging the inner surfaces of the rings 18 and 19. As shown, the rotor is formed by a pair of rings 26 secured to the hub 10 and of a size to fit slidably against the lands 25 on the rings 18 and 19. Each of the rings 26 is formed with a series of radially extending pockets 27 which are equal in number to the recesses in the rings 18 and 19. Each of the pockets carries a gate member shown as a cylindrical roller 28 which fits relatively loosely in the pocket and which is adapted to move radially therein. The ends of the rotor are closed by end plates 29 rigidly secured to the rings 26 through a rivet 31. A spacing ring 32 is provided between the rings 26 to hold them properly spaced and to serve as a carrier for a valve ring described hereinafter.

According to one of the features of the present invention, either the rollers or the recesses in the adjacent series are staggered circumferentially so that when the rollers of one series are just entered the recesses, the rollers of the other series are just leaving the recesses. As shown, the two sets are in axial alignment and the rings 18 and 19 are turned through 120 degrees with respect to each other so that when viewed axially, as in Figure 2, the ends of the recesses just overlap. With this construction, when one set of rollers is travelling through the recesses and is effective to transmit torque, the other set of rollers is travelling across the lands on its ring and is ineffective to transmit torque. Since the lands and recesses are substantially co-extensive, one set of rollers will pick up the torque load simultaneously with travel of the other set of rollers out of the recesses so that a smooth continuous torque transmission is provided.

As the rotor rings 26 turn clockwise, as seen in Figure 2, the rollers will serve to divide the recesses into high pressure chambers in advance of the rollers and low pressure chambers trailing the rollers. In order to supply fluid to the low pressure chambers, an annular valve member 33 is provided rotatably mounted on the spacing ring 32. Movement of the valve ring on the spacing ring is limited by providing an elongated groove 34 in the spacing ring which receives a pin 35 carried by the valve ring. The valve ring, as shown in Figure 1, extends outward between the casing rings 18 and 19 to hold them spaced and to provide a friction drag on the valve ring which will cause it to shift on the rotor in response to the direction of rotation of the rotor relative to the casing. The valve ring is formed at three equally spaced points with inwardly extending notches 36 which are adapted to connect the open keyways 21 with the low pressure chambers trailing the rollers 28. When the rotor is turned clockwise, the valve ring 33 will occupy the position shown in Figure 2 to supply fluid from the interior of the casing through the open keyways 21 to the low pressure chambers trailing the rollers. If the rotor should be turned in the opposite direction, the friction drag on the valve ring 33 would cause it to shift sufficiently to bring the notches 36 in register with the opposite sides of the rollers to communicate with the chambers which become the low pressure chambers when the direction of rotation is reversed. In this way, fluid is always supplied to the low pressure or expanding chambers.

The fluid in the high pressure chambers on the advancing side of the rollers may be placed under pressure as the rotor tends to turn in the casing. Preferably the rollers have a relatively loose fit in the pockets 27 so that fluid from the high pressure chambers can pass the rollers and enter the pockets. It will be noted that the loose fit does not interfere with efficient torque transmission since the high pressure on the inner roller surface holds it out against the ring surface and the high pressure on the feed side of the roller will hold it tightly against the trailing side of the pocket. In this way, the high pressure developed in advance of the rollers is utilized to hold the rollers positively against the casing ring surfaces to insure a relatively tight sealing engagement at all times. The pockets, as shown in Figure 1, are formed with inward extensions 37 which communicate with each other radially within the spacing ring 32 and which form outlet passages for the high pressure fluid. It will be noted that the several pocket extensions 37 are interconnected by the annular chamber 38 within the spacing ring 32 so that the pressures in all of the pockets are equalized at all times. The pockets may communicate with one or more control valves which may be so designed as to produce the desired operating characteristics for the coupling as shown, there are two control valves, one of which is a speed responsive valve to prevent transmission of torque below a predetermined speed and the other of which is an overload release valve to limit the torque which can be transmitted by the coupling. The speed responsive valve comprises a valve member 39 normally urged away from its seat by a spring 41 and seating radially so that it may be open below a predetermined speed and closed above such speed. The torque limiting valve comprises a valve member 42 urged against its seat by a spring 43 and adapted to open in response to a predetermined pressure to limit the pressure.

When the casing is filled with the liquid such as oil and the rotor is turned in a counter-clockwise direction or the rings are turned in a clockwise direction, as seen in Figure 2, the rollers 28 will ride over the inner surfaces of the rings 18 and 19 being urged against the rings by pressure developed in the pockets 27. Initially with the valve 39 open, liquid trapped in the recesses ahead of the rollers can discharge past the rollers through the pocket and past the valve 39 so that no pressure will be developed in the pockets or in the high pressure chambers ahead of the rollers. At this time, the rollers will engage the casing rings lightly so that a portion of the liquid will flow between the rollers and the rings and no substantial torque will be transmitted from the rotor to the casing. As the speed of the rotor increases either due to its driving speed or to the relatively small torque transmitted to it by the rings, to the point where the valve 39 closes, in response to centrifugal force, pressure will build up in the pockets beneath the rollers and hold the rollers more tightly against the inner casing surfaces so that leakage of fluid between the rollers and casing surfaces will be substantially prevented. It will be noted that at all times the low pressure chambers trailing the rollers are kept full of liquid through the open keyways 21 and the notches 36 in the valve ring 33. Therefore, when the valve 39 closes, liquid will be trapped ahead of the rollers in the recesses and will be held against escape so that the rotor and the casing will tend to turn as a unit. If the load should become too great, the valve 42 will open permitting the escape of fluid from the high pressure chambers and limiting the amount of pressure which can be built up in the chambers.

It will be noted that during slipping, as for example when the valve 42 is open, the rollers of one series will be effective in the recesses of that series while the rollers of the other series are travelling over the cylindrical lands 25. As the rollers of the first series start to travel out of the recesses of that series, the rollers of the opposite series will be just entering the corresponding recesses. Therefore, as the rollers of the first series drop the load, those of the second series pick it up so that a smooth continuous transmission of torque is provided. It will be noted that the total volume in the pockets and discharge passages is constant at all times since inward movement of one set of rollers in its pockets is accompanied by simultaneous outward movement of the other set of rollers in its pockets so that the control valves are not subjected to surges.

In the coupling, as shown, it will be seen that the rotor is supported entirely by the cylindrical lands 25 of the casing rings so that the unit is entirely self contained and does not require any external bearings. It will further be seen that because a symmetrically arranged number of recesses lying in the same plane are always effective at the same time, the bearing load is internally balanced. These features greatly simplify the construction and, together with the fact that a plurality of displacement members are always simultaneously effective, enable a coupling of minimum size to transmit maximum torque.

While one embodiment of the invention has been shown and described in detail, it will be understood that it is illustrative only and is not intended to be a definition of the scope of the invention, reference being had for this purpose to the appended claims.

What is claimed is:

1. A coupling comprising a hollow casing member, a rotor member in the casing, one of the members having a substantially cylindrical surface and the other being formed with a series of circumferentially spaced recesses separated by lands which engage said one member, a series of radially movable gates carried by said one member and movable into the recesses to divide the recesses into low and high pressure chambers, an annular valve member mounted for limited circumferential shifting movement on the rotor member and formed with passages to communicate with the recesses at the trailing sides of the gates and frictionally engaging the casing member to be shifted thereby to maintain said communication regardless of the direction of rotation of the rotor member, and means forming a fluid inlet passage communicating with the valve member.

2. A coupling comprising a hollow casing formed on its inner surface with a series of circumferentially spaced recesses separated by lands equidistant from the casing axis, a rotor of circular section fitting in the casing and sealingly engaging the lands, the rotor having a series of radially extending pockets in its outer surface, gates slidable in the pockets to engage the inner casing surface and separate the recesses into high pressure chambers leading the gates and low pressure chambers trailing the gates, the gates fitting loosely in the pockets whereby the high pressure chambers communicate with the pockets around the gates, an annular valve mounted on the rotor to turn in response to the direction of rotation of the rotor and having ports to supply fluid to the recesses at the trailing sides of the gates regardless of the direction of rotation, and means forming a fluid supply passage communicating with the valve.

3. A coupling comprising a hollow casing formed on its inner surface with a series of circumferentially spaced recesses separated by lands equidistant from the casing axis, a rotor of circular section fitting in the casing and sealingly engaging the lands, the rotor having a series of radially extending pockets in its outer surface, gates slidable in the pockets to engage the inner casing surface and separate the recesses into high pressure chambers leading the gates and low pressure chambers trailing the gates, the gates fitting loosely in the pockets whereby the high pressure chambers communicate with the pockets around the gates, valve means controlling the discharge of fluid from the pockets, and valve means shiftable in response to the direction of rotation of the rotor to supply fluid to the low pressure chambers.

4. A coupling comprising a casing having a tubular wall section formed on its inner surface with a plurality of axially spaced series of circumferential recesses separated by lands equidistant from the casing axis, a rotor of circular cross section rotatable in the casing and engaging the lands, a plurality of axially spaced series of gate members normally carried by the rotor and of the same axial length as the recesses to move radially respectively into the series of recesses, one of the gate members and recesses of one series being circumferentially staggered with respect to the corresponding elements of another series, and a valve on the rotor mounted for limited rotation thereon and frictionally engaging the casing to be shifted in response to the direction of rotation of the rotor to supply fluid to the trailing sides of the gate members regardless of the direction of rotation of the rotor.

5. A coupling comprising a casing having a tubular wall section formed on its inner surface with a plurality of axially spaced series of circumferential recesses separated by lands equidistant from the casing axis, a rotor of circular cross section rotatable in the casing and engaging the lands, a plurality of axially spaced series of gate members movably carried by the rotor and of the same axial length as the recesses to move radially respectively into the series of recesses, the recesses of adjacent series being circumferentially staggered and the gate members being axially aligned, and a single valve ring on the rotor between the series of gate members and shiftable in response to the direction of rotation thereof to supply fluid to the trailing sides of the gate members of both series regardless of the direction of rotation.

6. A coupling comprising a casing having a tubular wall section formed on its interior with a plurality of axially spaced series of circumferentially staggered recesses separated by lands equidistant from the casing axis, a rotor of circular cross section in the casing engaging the lands, the rotor being formed with a plurality of axially spaced series of radial pockets corresponding in number and spacing and axial length to the recesses, gate members slidably mounted in the pockets to engage the inner casing surface, the pockets and gate members being so formed as to provide a fluid passage between the pockets and the leading sides of the gate members, means forming a fluid outlet passage communicating with the pockets, valve means controlling the outlet passage, and means to supply fluid to the trailing sides of the gate members.

7. A coupling comprising a casing having a tubular wall section formed on its interior with a plurality of axially spaced series of circumferential recesses separated by lands equidistant from the casing axis, a rotor of circular cross section in the casing engaging the lands, the rotor being formed with a plurality of axially spaced series of radial pockets corresponding in number and spacing and axial length to the recesses, gate members slidably mounted in the pockets to engage the inner casing surface, the gate members and pockets of one series being circumferentially staggered with respect to the corresponding elements of an adjacent series, the gate members fitting loosely in the pockets to provide a fluid passage between the pockets and the leading sides of the gate members, means forming an outlet passage communicating with the pockets, valve means controlling the outlet passage, and a valve shiftable in response to the direction of rotation of the rotor to supply fluid to the trailing sides of the gate members regardless of the direction of rotation.

8. A coupling comprising a casing having a tubular wall section formed on its interior with a plurality of axially spaced series of circumferential recesses, a rotor of circular cross section in the casing, the rotor being formed with a plurality of axially spaced series of radial pockets corresponding in number and spacing to the recesses, gate members slidably mounted in the pockets to engage the inner casing surface, one of the gate members and pockets of one series being circumferentially staggered with respect to the corresponding elements of an adjacent series, the gate members fitting loosely in the pockets to provide communication between the pockets and the leading sides of the gate members, means forming an outlet passage communicating with the pockets, valve means controlling the outlet passage, and an annular valve mounted on the rotor to shift in response to the direction of rotation of the rotor, the valve having inlet ports to register with the trailing sides of the gate members in either direction of rotation of the rotor.

9. A coupling comprising a casing having a tubular section formed on its inner surface with two axially spaced series of cylindrical lands separated by recesses of substantially the same circumferential extent as the lands, a cylindrical rotor in the casing sealingly engaging the lands, and two series of gate members carried by the rotor integrally related in number to the recesses and of the same axial length as the recesses and the lands to engage the inner surfaces of the recesses and lands of the respective series, the gate members and lands of one series being circumferentially staggered relative to the corresponding elements of the other series so that when the gate members of one series are just entering the recesses the gate members of the other series are just leaving the recesses.

10. A coupling comprising a casing having a tubular section formed on its inner surface with two axially spaced series of cylindrical lands separated by recesses of substantially the same circumferential extent as the lands, a cylindrical rotor in the casing sealingly engaging the lands, two series of gate members carried by the rotor integrally related in number to the recesses and of the same axial length as the recesses and the lands to engage the inner surfaces of the recesses and lands of the respective series, the gate members and lands of one series being circumferentially staggered relative to the corresponding elements of the other series so that when the gate members of one series are just entering the recesses the gate members of the other series are just leaving the recesses, and a valve shiftable in response to rotation of the rotor to supply fluid to the trailing sides of the gate members regardless of the direction of rotation.

KENNETH E. LYMAN.

REFERENCES CITED

The following references are of record in the file of this patent:

UNITED STATES PATENTS

| Number | Name | Date |
|---|---|---|
| 1,514,804 | Staude | Nov. 11, 1924 |
| 1,559,462 | Ryan | Oct. 27, 1925 |
| 1,567,912 | Carey | Dec. 29, 1925 |
| 1,749,121 | Barlow | Mar. 4, 1930 |
| 1,823,389 | DeLavaud | Sept. 15, 1931 |
| 2,242,734 | Whittlesey | May 20, 1941 |
| 2,380,445 | Johnson et al. | July 31, 1945 |
| 2,460,018 | Looke | Jan. 25, 1949 |